UNITED STATES PATENT OFFICE 2,231,125

ESTERS OF TOCOPHEROLS

Paul Karrer, Zurich, Switzerland, assignor to Hoffmann-La Roche Inc., Nutley, N. J., a corporation of New Jersey No Drawing. Application July 29, 1939, Serial No. 287,401. In Switzerland August 10, 1938

3 Claims. (Cl. 260—333)

Of the aliphatic esters of tocopherols only the acetate of $\alpha$-tocopherol is known. Its vitamin E activity, however, is disputed. Whereas according to Evans and Burr (Memoirs of the University of California, 8, year 1927, page 140) the vitamin E activity gets lost on acetylation, the $\alpha$-tocopherol acetate is stated to remain effective, according to Olcott (Journal of Biological Chemistry, 110, year 1935, page 695).

It has now been found that the higher fatty acid esters of tocopherols unequivocally exert a vitamin E action. The esters of tocopherols with aliphatic carboxylic acids, prepared in the usual manner, containing 12 to 18 carbon atoms, are oils or solid substances, which, contrary to the unesterified tocopherols, do not reduce neutral, methyl alcoholic silver nitrate solution. For the purpose of the invention higher fatty acids containing 12 to 18 carbon atoms may be employed, for example, lauric acid, stearic acid, oleic acid.

The method for the preparation of the esters of tocopherols with aliphatic fatty acids is substantially the same for all the acids used. Below are given some examples for the preparation of said esters without, however, limiting the invention thereto.

Example 1

$\alpha$-tocopherol is dissolved in dry pyridine and mixed with slightly more than 1 mole of stearic acid chloride. The mixture is left to stand for six hours and then heated to 50° C. to 60° C. for one hour. After dilution of the reaction mixture with water it is extracted with ether. The excess of stearic acid is then extracted from the ethereal layer by repeated shaking with a very dilute solution of caustic soda, and the ethereal layer is finally washed with water. After evaporating the ether, $\alpha$-tocopherol stearic acid ester remains as a viscous oil which slowly turns into a solid and crystalline substance. It is only slightly soluble in ethanol.

Example 2

A mixture of $\beta$-tocopherol, oleic acid chloride and pyridine is heated to 50–60° C. during 1 hour. The working up of the reaction solution is carried out as described in Example 1.

$\beta$-tocopherol oleic acid ester is a viscous oil which is slightly soluble in alcohol. It does not reduce silver nitrate solution.

I claim:
1. $\alpha$-tocopherol stearic acid ester.
2. $\beta$-tocopherol oleic acid ester.
3. An ester of a tocopherol with an aliphatic carboxylic acid selected from the group consisting of stearic acid and oleic acid.

PAUL KARRER.